United States Patent [19]

Salmi et al.

[11] 4,064,950

[45] Dec. 27, 1977

[54] HYDRAULIC DRILLING MACHINE

[76] Inventors: Pekka Salmi, Tohlopinkatu 5-7 B; Rolf Strom, Kohmankaari 1 B 5, both of 33310 Tampere 31; Eero Hirvisaari, Kreetantie 7 E 56, 33950 Pirkkala 5, all of Finland

[21] Appl. No.: 706,574

[22] Filed: July 19, 1976

[51] Int. Cl.² .......................................... B23Q 5/027
[52] U.S. Cl. ...................................... 173/151; 173/8; 173/9
[58] Field of Search .......................... 173/8, 9, 19, 151

[56] References Cited

U.S. PATENT DOCUMENTS

| 3,189,103 | 6/1965 | Attebo et al. | 173/8 |
| 3,409,089 | 11/1968 | Meyer | 173/9 |
| 3,581,830 | 6/1971 | Stoner | 173/9 |
| 3,802,514 | 4/1974 | Ein et al. | 173/8 |

FOREIGN PATENT DOCUMENTS 2,129,276  10/1972  France.

Primary Examiner—Robert Hafer
Attorney, Agent, or Firm—Bosworth, Sessions & McCoy

[57] ABSTRACT

A hydraulic drilling machine for cutting into rock formations and the like. The machine has a rotating drill rod with a bit at one end and a rotary hydraulic drive motor at the other end. The drill rod is supported on a carriage adapted for linear travel to advance the rotating bit into the rock formation. The carriage is extended and retracted by means of a hydraulic feed motor. The rotary hydraulic motor and the hydraulic feed motor are connected in series in the hydraulic operating system so that when rotation resistance increases accompanied by a greater pressure drop across the rotary hydraulic motor, there is a consequent decrease in the force exerted by the hydraulic feed motor in order to avoid jamming of the drill bit.

4 Claims, 2 Drawing Figures

HYDRAULIC DRILLING MACHINE

BACKGROUND OF THE INVENTION

This invention relates to a hydraulic drilling machine, especially a rock drill comprising a striking apparatus, a rotating motor and a feed motor, as well as pumps and valves necessary for their operation and control.

French Pat. No 2,129,276 discloses a hydraulic drilling machine in which the striking apparatus is connected in series with the rotating motor of the drill, whereby increasing rotation resistance and pressure drop across the rotating motor decreases the power of the striking apparatus in order to avoid jamming of the drill steel. When starting to drill, as well as when drilling considerably nonhomogenous material, the function of this arrangement, however, does not serve the purpose. When the drill is rotating freely, or in a soft material, the striking force is at its maximum even if the striking and feed forces ought to be small in order to feed the drill slowly into contact with a hard material.

In a drilling machine according to U.S. Pat. No. 3,979,944, this disadvantage has been eliminated by means of a suitable valve control. When using conventional valves it is not possible to accomplish a stepless control at reasonable cost.

A principal object of this invention is to provide an improved drilling machine in which the rotating, striking and feed forces are automatically and steplessly adjusted in proportion to the nature of the material to be drilled so that boring of the hole proceeds without difficulty even on an oblique and uneven rock surface, and also so that when drilling is fissured rock the drill steel does not jam, but the drilling can continue in difficult and changing circumstances.

In order to realize this object, for example the feed force, when starting to drill into an oblique wall, has to be considerably smaller than in normal drilling. The adjustability of the feed force in proportion to individual starting situations offers advantages in changeable starting conditions. When drilling into a fissure, the need for automatic control of the feed force is great. The feed force must be small enough in order to prevent the drill steel from wedging deeper into a fissure. When the drill steel is badly jammed, the feed force must change its direction in order to pull the drill out of the hole. Thereby it is also advantageous to decrease the striking force. When the drill has been freed, a new effort to penetrate through the fissure can be started.

SUMMARY OF THE INVENTION

In a drilling machine according to the invention, the object of the invention is realized by connecting the feed motor of the striking apparatus and the rotating motor of the drill in series. When the striking apparatus is fed forward, towards the rock, the feed motor receives its pressure liquid from the pump and the rotating motor receives pressure liquid from the outlet side of the feed motor. The hydraulic pressure transmitted to the feed motor is kept essentially constant by valve and coupling arrangements.

BRIEF DESCRIPTION OF THE DRAWINGS

In the following, the invention will be more closely described by means of an example, with reference to the accompanying drawings in which.

DESCRIPTION OF THE PREFERRED EMBODIMENT

Figure 1:
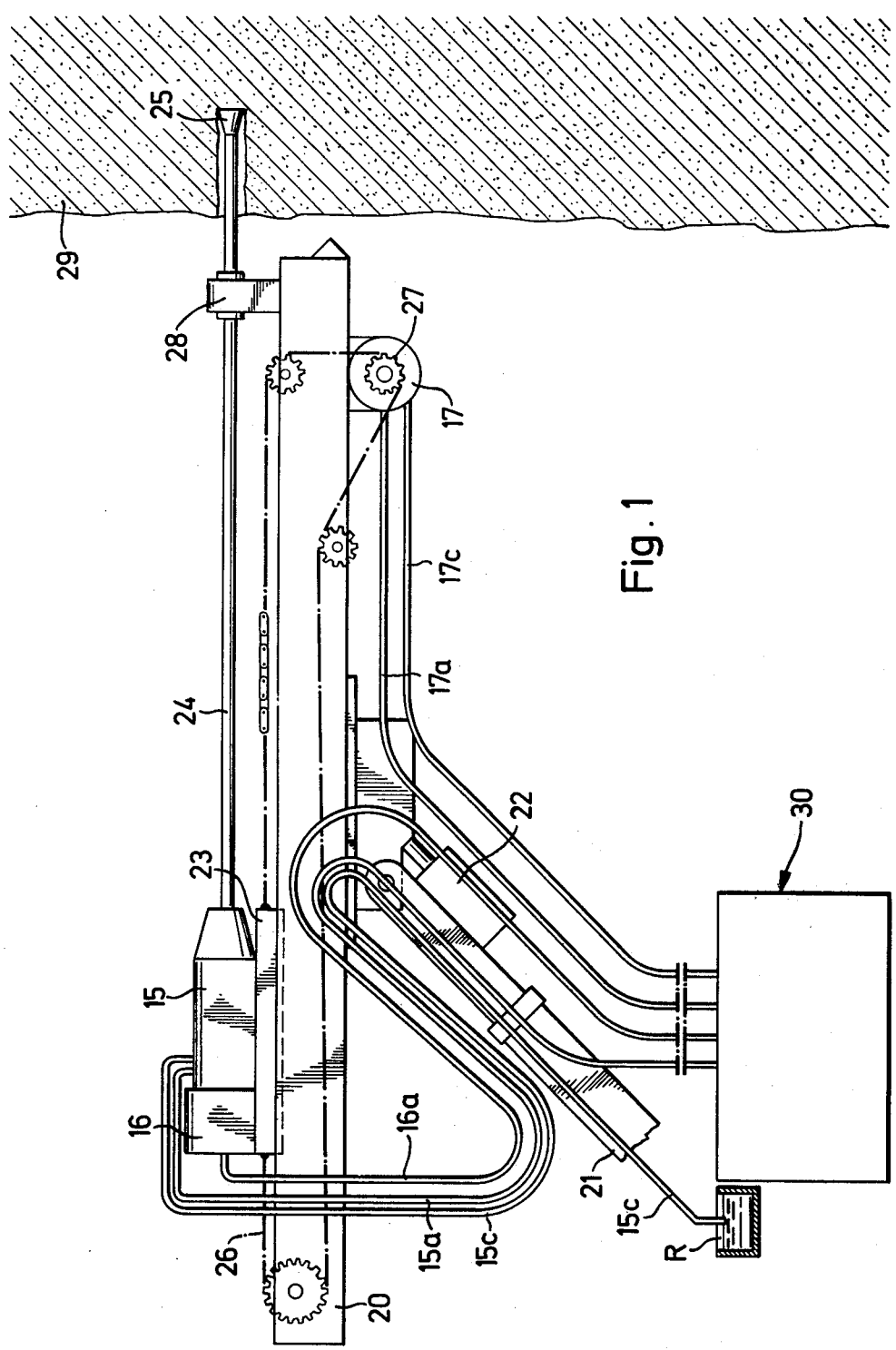
FIG. 1 is an elevational view of a drilling machine embodying the invention.

FIG. 1 shows a conventional hydraulic drilling machine comprising a feed frame 20, rotatably mounted at the end of a supporting boom 21 which can be mounted e.g., on a chassis on wheels which is not shown in the drawings. The position of the frame 20 can be adjusted in relation to the supporting boom 21 by a hydraulic cylinder device 22. Mounted on a carriage 23 supported on the frame 20 are a hydraulic striking apparatus 15 and a rotary hydraulic motor 16 that turns a drill rod 24, at the end of which is a bit 25. The drill rod 24 is supported by a bearing 28 at the end of the feed frame 20.

Figure 2:
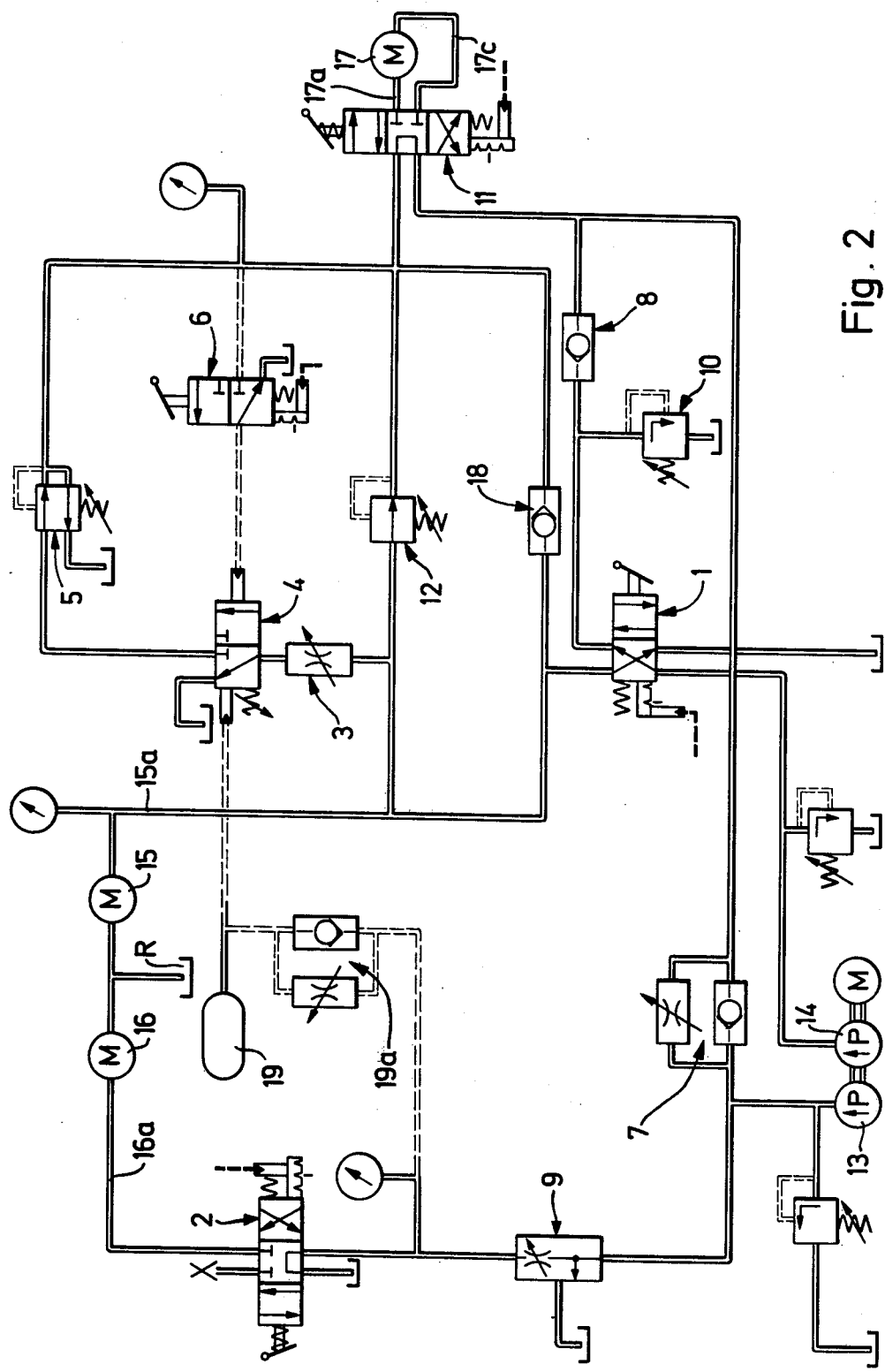
FIG. 2 is a schematic circuit diagram of a hydraulic drilling machine embodying the invention.

The carriage 23 is arranged to be movable e.g. by a chain 26 running over suitable, freely rotatable sprockets and over a driving sprocket 27 mounted on the output shaft of a hydraulic feed motor 17. The motor 17 feeds the drill rod 24 and drill bit 25 into a material such as rock or a vertical mine wall 29 in order to bore a hole into it. Hydraulic fluid is fed to the feed motor 17 through hydraulic lines 17a and 17c. The hydraulic fluid is fed to the striking apparatus 15 of the drilling machine and to the rotating motor 16 through hydraulic lines 15a and 16a, and it returns to tank R through hydraulic line 15c. The control and adjustment of the supply of hydraulic fluid takes place in a control center 30, which is more completely described below with reference to FIG. 2.

The feed motor 17 and the rotating motor 16 of the drill are connected in series so that when the striking apparatus 15 is fed forward into the rock, the feed motor 17 receives its hydraulic pressure from the pump 14 and the rotating motor 16 receives hydraulic pressure from the outlet side of the feed motor 17. Further, the pressure of the liquid coming to the feed motor 17 is kept essentially constant by valve and coupling arrangements as will be described below.

The function of this arrangement is as follows: When a fissured rock is drilled, the pressure differential across the rotating motor 16 increases, because the load increases. Because the total pressure differential over the feed and rotating motors remains constant, the pressure difference over the feed motor 17 decreases and at the same time the feed force decreases.

In order to change the feed direction when the drill is badly jammed, the other hydraulic pump 13 is coupled so that the feed motor 17 and the rotating motor 16 are located parallel in relation to the hydraulic pump 13, whereby the pump 13 is on the outlet side of the feed motor, when the striking apparatus 15 is fed towards the rock. If the rotating motor 16 is thereby subjected to a big load, as when drilling in a difficult fissured rock, the pressure differential across the feed motor 17 decreases and turns through null to a different sign, whereby the feed direction reverses, because the pressure of the liquid coming to the feed motor 17 is kept constant by valve and coupling means.

The pressure of the side of the feed motor 17 facing the striking apparatus 15 is kept constant by means of two pressure regulating valves 5 and 12 connected in parallel and located in the part of the circuit which is between the feed motor 17 and the striking apparatus 15. Located between the pressure regulating valves 5 and 12 is a direction valve 4 which is controlled by the pressure side of the rotating motor 16 and by that side of the feed motor 17, the pressure of which is adjusted by means of the pressure regulating valves 5 and 12. There is also provided a direction valve 6, by means of which the control signal can be switched on and off. In one position of the direction valve 4 the part of the circuit comprising the striking apparatus 15 is connected to the tank R. Thus, the pressure of the striking apparatus 15 can be adjusted by means of a throttle 3. In the other position of the direction valve 4 the pressure regulating valves 5 and 12 are connected in parallel, whereby the pressure adjusts itself according to the higher pressure limit.

The function of this coupling system is as follows: When the pressure in the part of the circuit including the rotating motor 16 exceeds a certain pressure limit, the direction valve 4 reduces the force exerted by the striking apparatus 15 to one half by returning part of the hydraulic pressure liquid to the tank. At the same time, the feed motor 17 reverses its direction, because the pressure in the part of the circuit including the striking apparatus 15 is adjusted by means of the pressure regulating valve 12 so that it is lower than the pressure differential across the rotating motor 16. When the drill becomes free, this pressure difference decreases, whereby the direction valve 4 returns the hydraulic pressure supplied to the striking apparatus 15 to its normal condition. By means of the pressure regulating valve 5 the pressure of the feed motor 17 is adjusted to conform to the optimum feed force.

When boring the hole, the direction valve 4 is positioned to transmit half pressure. The control signal of the direction valve 4 from the other side has been switched off by valve 6. The pressure regulating valve 12 adjusted to the lower pressure limit determines the pressure of the part of the feed motor 17 facing the striking apparatus 15. The pressure differential across the feed motor decreases a little when the drill touches the rock. When boring begins, the control signal from the direction valve 4 is switched on by means of valve 6. Valve 6 can be controlled manually, or the control can be furnished with a pressure accumulator acting as a timer. The direction valve 4 changes its position and the normal working and feeding pressure of the striking apparatus 15 prevails. A timer 19, 19a can be connected to the control connection which is coupled to the pressure side of the rotating motor 16. The operation of the timer is as follows: After a jamming situation where the striking apparatus has been switched to half pressure, a renewed effort to start to penetrate through the fissure can be initiated only after a certain time. After that time has elapsed, the drilling at full pressure can be started.

By means of the direction valve 2 the rotating motor 16 can be disengaged.

The purpose of the direction valves 1 and 11 are quick return and change of the feed direction.

In direction valves 1, 2 and 11 there are a handlever and a release of fixed setting.

The forward limit of the feed causes a pressure pulse to valve 1, whereby the feed direction changes and the entire output of the pump 14 operating the striking apparatus 15 is transmitted to the feed motor 17. If a reduced high-speed rate is desired, the adjustment can be accomplished with valve 10, by means of which part of the supply can be eliminated. When the striking apparatus 15 has returned to the other end of the feed device 17, the rearward limit of the feed causes a pulse to be transmitted to valve 11, which disconnects the pump 14 of the striking apparatus.

By the volume regulating valve 9 the speed of rotation can be controlled.

While the invention has been shown and described with respect to a specific embodiment thereof, this is for the purpose of illustration rather than limitation and other variations and modifications of the specific device herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the skill in the art has been advanced by the invention.

We claim:

1. In a hydraulic drilling machine including a hydraulic striking apparatus, a rotatable drill rod connected to said striking apparatus at one end and having a bit at the other end, a rotary hydraulic motor for turning said rod and bit and means including a hydraulic feed motor for advancing said striking apparatus and said rod and bit in an axial direction, hydraulic pressure means including hydraulic circuit means for operating said striking apparatus and said hydraulic motor, the improvement wherein said rotary hydraulic motor and said hydraulic feed motor are connected in series in said hydraulic circuit means.

2. A hydraulic drilling machine as defined in claim 1 wherein said circuit means comprises valve means whereby when said striking apparatus and said shaft and bit are fed toward drilling engagement said rotary hydraulic motor receives hydraulic pressure from the outlet side of said feed motor, and means for maintaining the pressure supplied to the feed motor at an essentially constant level.

3. A hydraulic drilling machine as defined in claim 1 wherein said hydraulic pressure means comprises a first pump connected in said circuit means to provide a series connection between said feed motor and said rotary hydraulic motor, and a second pump selectively connected in said circuit means to provide a parallel connection between said feed motor and said rotary hydraulic motor relative to said second pump.

4. A hydraulic drilling machine as defined in claim 1 comprising pressure regulating means located between said hydraulic pressure means and said feed motor to control the hydraulic pressure in said series circuit.

* * * * *